United States Patent
Ryu et al.

(10) Patent No.: US 10,970,002 B2
(45) Date of Patent: Apr. 6, 2021

(54) STORAGE DEVICE FOR SECURITY ACCESS AND METHOD OF OPERATING THE SAME

(71) Applicant: SK hynix Inc., Gyeonggi-do (KR)

(72) Inventors: Tae Kyu Ryu, Gyeonggi-do (KR); Young Kyun Shin, Seoul (KR); Byoung Kwan Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/518,454

(22) Filed: Jul. 22, 2019

(65) Prior Publication Data

US 2020/0159453 A1 May 21, 2020

(30) Foreign Application Priority Data

Nov. 15, 2018 (KR) .................. 10-2018-0141149

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC .......... *G06F 3/0659* (2013.01); *G06F 3/0604* (2013.01); *G06F 3/0653* (2013.01); *G06F 3/0673* (2013.01)

(58) Field of Classification Search
CPC .... G06F 3/0659; G06F 3/0673; G06F 3/0653; G06F 3/0604
See application file for complete search history.

(56) References Cited

U.S. PATENT DOCUMENTS

2020/0065528 A1\* 2/2020 Ogawa .................... G06F 21/78

FOREIGN PATENT DOCUMENTS

| KR | 10-2010-0029298 | 3/2010 |
| KR | 10-2012-0046449 | 5/2012 |

\* cited by examiner

*Primary Examiner* — Mark A Giardino, Jr.
(74) *Attorney, Agent, or Firm* — IP & T Group LLP

(57) ABSTRACT

Provided herein may be a storage device and a method of operating the same. A memory controller may include a power application timer configured to measure each of plural final power application times, each final power application time being a period of time during which power is applied to the memory controller until the memory controller is turned off after being turned on, and a command blocker configured to disable a set command, among commands that are input from a host to the memory controller depending on a cumulative power application time obtained by accumulating the plural final power application times.

17 Claims, 13 Drawing Sheets

STORAGE DEVICE FOR SECURITY ACCESS AND METHOD OF OPERATING THE SAME

CROSS-REFERENCE TO RELATED APPLICATION

The present application claims priority under 35 U.S.C. § 119(a) to Korean patent application number 10-2018-0141149, filed on Nov. 15, 2018, which is incorporated by reference in its entirety.

BACKGROUND

1. Field of Invention

Various embodiments of the present disclosure generally relate to an electronic device, and more particularly, to a storage device and a method of operating the storage device.

2. Description of Related Art

A storage device stores data under the control of a host device, such as a computer or a smartphone. The storage device may include a memory device in which data is stored and a memory controller which controls the memory device. Such a memory device may be a volatile memory device or a nonvolatile memory device.

In a volatile memory device stored data is retained only when power is supplied; stored data is lost when the supply of power is interrupted. Examples of a volatile memory device include a Static Random Access Memory (SRAM) and a Dynamic Random Access Memory (DRAM).

In a nonvolatile memory device stored data is retained even when the supply of power is interrupted. Examples of a nonvolatile memory device include a Read Only Memory (ROM), a Programmable ROM (PROM), an Electrically Programmable ROM (EPROM), an Electrically Erasable and Programmable ROM (EEPROM), and a flash memory.

SUMMARY

Various embodiments of the present disclosure are directed to a storage device having improved security and a method of operating the storage device.

An embodiment of the present disclosure may provide for a memory controller. The memory controller may include a power application timer configured to measure each of plural final power application times, each final power application time being a period of time during which power is applied to the memory controller until the memory controller is turned off after being turned on, and a command blocker configured to disable a set command, among commands that are input from a host to the memory controller depending on a cumulative power application time obtained by accumulating the plural final power application times.

An embodiment of the present disclosure may provide for a storage device. The storage device may include a memory device configured to store information about a cumulative power application time that is obtained by accumulating individual time periods during which power is applied to a storage device until the storage device is turned off after being turned on, and a memory controller configured to disable a set command, among commands that are input from a host to the storage device, depending on the cumulative power application time.

An embodiment of the present disclosure may provide for a method of operating a storage device. The method may include measuring final power application times, each being a period of time during which power is applied to the storage device until the storage device is turned off after being turned on, storing information about a cumulative power application time obtained by accumulating the measured power application times and disabling a set command, among commands that are input from a host to the storage device depending on the cumulative power application time.

An embodiment of the present disclosure may provide for a storage device. The storage device may include a timer configured to measure each of plural power application times of the storage device, each power application time being a time duration between power-on and power-off of the storage device, a memory device configured to store each of the measured power application time and a command rejection component configured to reject a restricted command provided from a host when a time represented by an accumulation of the stored power application times becomes greater than a threshold time, and to output a rejection response signal to the host when the restricted command is rejected.

DETAILED DESCRIPTION

Figure 1:
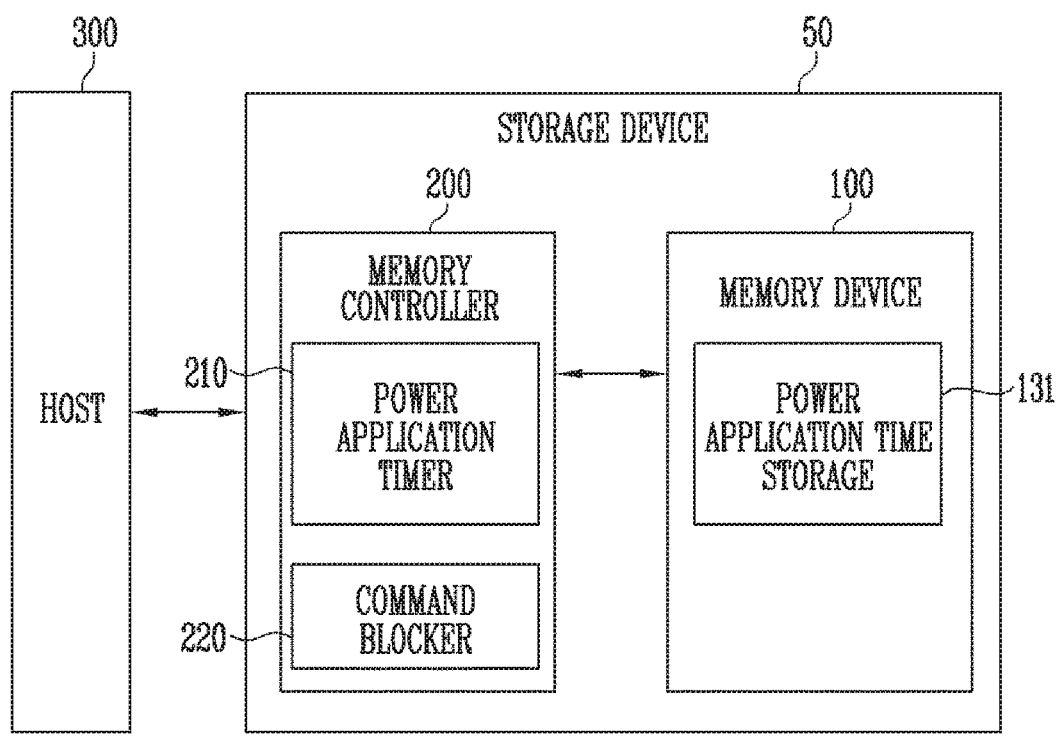
FIG. 1 is a diagram illustrating a storage device according to an embodiment of the present disclosure.

Specific structural and functional description is directed to explaining embodiments of the present disclosure. The present invention, however, is not limited by either the description or the disclosed embodiments.

The present invention may be embodied in many different forms, including variations of any of the disclosed embodiments. Thus, the present invention should be construed as covering modifications, equivalents and alternatives falling within ideas and technical scope of the present disclosure. That is, the present invention is not limited to particular modes of practice; rather, all changes, equivalents, and substitutes that do not depart from the spirit and technical scope of the present disclosure are encompassed by the present invention.

It will be understood that, although the terms "first" and/or "second" may be used herein to identify various elements, these elements should not be limited by these terms. These terms are only used to distinguish one element from another element that otherwise have the same or similar names. For instance, a first element in one instance could be termed a second element in another instance, and vice versa, without departing from the teachings of the present disclosure.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. The articles 'a' and 'an' as used in this application and the appended claims should generally be construed to mean 'one or more' unless specified otherwise or clear from context to be directed to a singular form. It will be further understood that the terms "comprise", "include", "have", etc., when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and not be interpreted in an idealized or overly formal sense unless expressly so defined herein.

Detailed description of functions and structures well known to those skilled in the art is omitted to avoid obscuring the subject matter of the present disclosure. This aims to omit unnecessary description so as to make the subject matter of the present disclosure clear.

Various embodiments of the present disclosure will now be described more fully with reference to the accompanying drawings, in which preferred embodiments of the present disclosure are illustrated, so that those skilled in the art can practice the invention.

FIG. 1 is a diagram illustrating a storage device according to an embodiment of the present disclosure.

Referring to FIG. 1, a storage device 50 may include a memory device 100 and a memory controller 200. The storage device 50 may be a device which stores data under the control of a host 300, such as a mobile phone, a smartphone, an MP3 player, a laptop computer, a desktop computer, a game console, a television (TV), a tablet personal computer (PC), or an in-vehicle infotainment system.

The storage device 50 may be configured as any of various types of storage devices depending on a host interface that is a scheme for communication with the host 300. The storage device 50 may be implemented as any of a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 is operated in response to the control of the memory controller 200. The memory device 100 may include a memory cell array including a plurality of memory cells which store data. The memory cell array may include a plurality of memory blocks. Each memory block may include a plurality of memory cells. A single memory block may include a plurality of pages. In an embodiment, each page may be a unit by which data is stored in the memory device 100 or by which data stored in the memory device 100 is read. A memory block may be a unit by which data is erased. In an embodiment, the memory device 100 may take many alternative forms, such as a double data rate synchronous dynamic random access memory (DDR SDRAM), a low power double data rate fourth generation (LPDDR4) SDRAM, a graphics double data rate (DDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). By way of example, description of features and aspects of the present invention is given in the context of the memory device 100 being a NAND flash memory.

The memory device 100 may receive a command and an address from the memory controller 200, and may access the region of the memory cell array, selected by the address. That is, the memory device 100 may perform an operation corresponding to the command on the region selected by the address. For example, the memory device 100 may perform a write operation (i.e., program operation), a read operation, and an erase operation. During a program operation, the memory device 100 may program data to the region selected by the address. During a read operation, the memory device 100 may read data from the region selected by the address.

During an erase operation, the memory device 100 may erase data stored in the region selected by the address.

In an embodiment, the memory device 100 may include a power application time storage 131.

The power application time storage 131 may be provided with information about power application times at set intervals or randomly from the memory controller 200. Each power application time may be time elapsed after the storage device 50 is turned on. Specifically, the each power application time may be a period of time during which power is applied to the storage device 50, after being turned on.

In an embodiment, information about power application time lastly provided before the storage device 50 is turned off may be information about final power application time. The final power application time may be a period of time from when the storage device 50 is turned on to when the storage device 50 is turned off.

The power application time storage 131 may store information about a cumulative power application time obtained by accumulating the provided final power application times. The power application time storage 131 may store the information about the cumulative power application time in a memory block. The power application time storage 131 may provide the cumulative power application time information to the memory controller 200 in response to a request or command from the memory controller 200.

The memory controller 200 controls the overall operation of the storage device 50.

When power is applied to the storage device 50, the memory controller 200 may run firmware (FW). When the memory device 100 is a flash memory device, the memory controller 200 may run firmware such as a Flash Translation Layer (FTL) for controlling communication between the host 300 and the memory device 100.

In an embodiment, the memory controller 200 may receive data and a logical block address (LBA) from the host 300, and may translate the logical block address (LBA) into a physical block address (PBA) indicating the address of memory cells which are included in the memory device 100 and in which data is to be stored.

The memory controller 200 may control the memory device 100 so that a program operation, a read operation or an erase operation is performed in response to a request received from the host 300. During a program operation, the memory controller 200 may provide a program command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may autonomously generate a program command, an address, and data regardless of a request from the host 300, and may transmit them to the memory device 100. For example, the memory controller 200 may provide commands, addresses, and data to the memory device 100 so as to perform background operations, such as a program operation for wear leveling and a program operation for garbage collection.

In an embodiment, the memory controller 200 may control a plurality of memory devices 100. In this case, the memory controller 200 may control the memory devices 100 based on an interleaving scheme to improve operating performance. The interleaving scheme may be an operating method in which the operating periods of at least two memory devices 100 overlap each other.

In an embodiment, the memory controller 200 may include a power application timer 210 and a command blocker 220.

The power application timer 210 may measure each of the power application times. The power application timer 210 may provide information about the measured power application times to the memory device 100 at set intervals or randomly. Power application time lastly measured before the storage device 50 is turned off may be final power application time. The final power application time may be a period of time during which power is applied until the storage device 50 is turned off after being turned on.

The command blocker 220 may periodically provide a command for requesting the cumulative power application time information to the memory device 100. The cumulative power application time is obtained by accumulating the provided final power application times. The command blocker 220 may disable a set command that is input to the storage device 50 depending on the cumulative power application time information provided from the memory device 100. The set command may be for analyzing and testing the storage device 50 and thus may not be serviced after the storage device 50 is released to the user.

For example, the command blocker 220 may disable the set command based on the result of a comparison between the cumulative power application time and a threshold time. When the cumulative power application time exceeds the threshold time, the command blacker 220 may disable the set command. When the set command is disabled, the memory controller 200 may output a rejection response signal for the set command to an external device.

The host 300 may communicate with the storage device 50 using at least one of various communication methods, such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
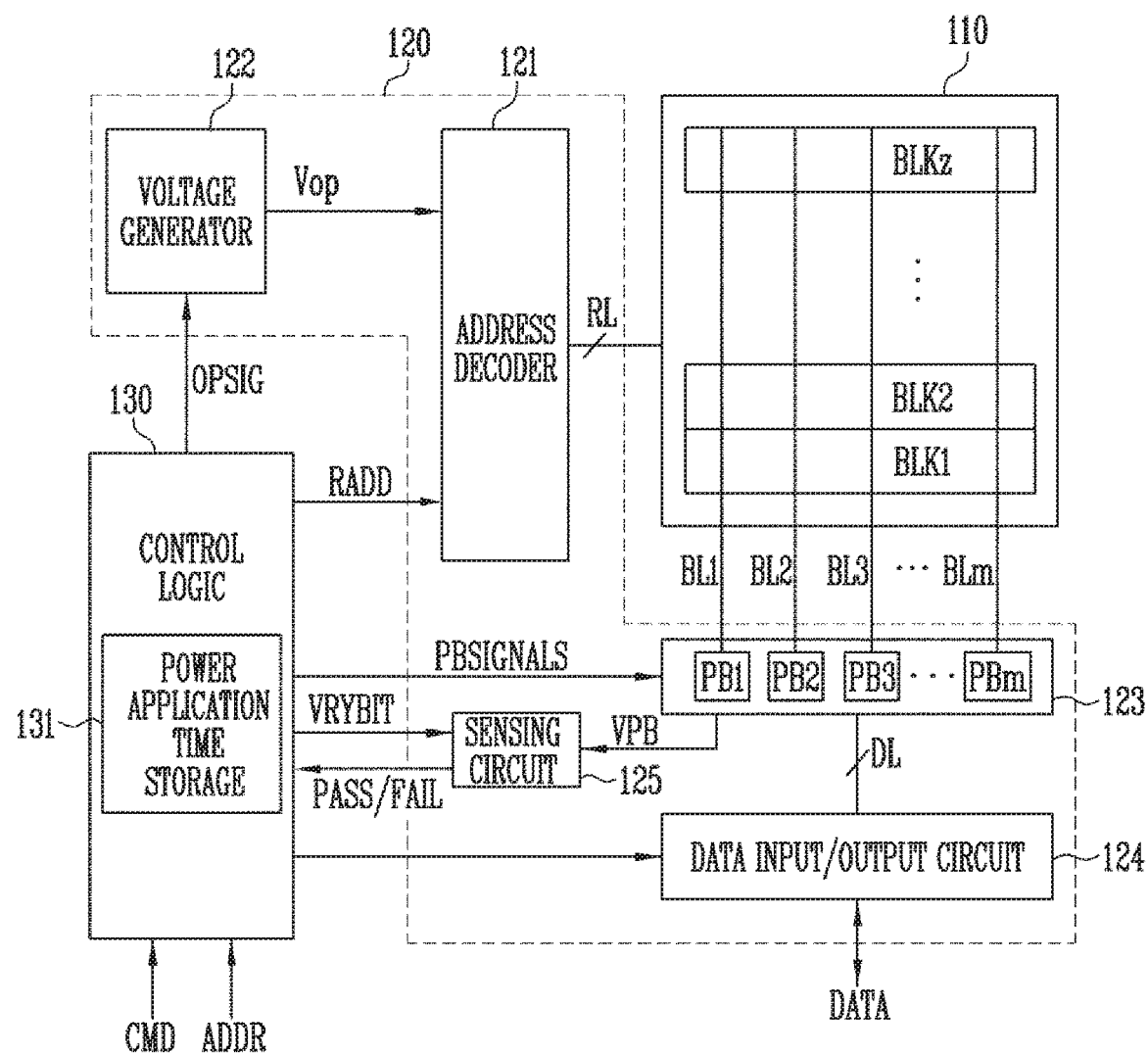
FIG. 2 is a diagram illustrating the structure of a memory device, such as that of FIG. 1.

FIG. 2 is a diagram illustrating the structure of the memory device of FIG. 1.

Referring to FIG. 2, the memory device 100 may include a memory cell array 110, a peripheral circuit 120, and control logic 130.

The memory cell array 110 includes a plurality of memory blocks BLK1 to BLKz. The plurality of memory blocks BLK1 to BLKz are coupled to an address decoder 121 through row lines RL. The memory blocks BLK1 to BLKz are coupled to a read and write circuit 123 through bit lines BL1 to BLm. Each of the memory blocks BLK1 to BLKz includes a plurality of memory cells. In an embodiment, the plurality of memory cells are nonvolatile memory cells. In the plurality of memory cells, memory cells coupled to the same word line are defined as a single page. That is, the memory cell array 110 is composed of a plurality of pages. In accordance with an embodiment of the present disclosure, each of the plurality of memory blocks BLK1 to BLKz included in the memory cell array 110 may include one or more dummy cells. The dummy cell(s) may be coupled in series between a drain select transistor and the memory cells and between a source select transistor and the memory cells.

Each of the memory cells of the memory device 100 may be implemented as a single-level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 120 may include the address decoder 121, a voltage generator 122, the read and write circuit 123, a data input/output circuit 124, and a sensing circuit 125.

The peripheral circuit 120 may drive the memory cell array 110. For example, the peripheral circuit 120 may drive the memory cell array 110 so that a program operation, a read operation, and an erase operation are performed.

The address decoder 121 is coupled to the memory cell array 110 through row lines RL. The row lines RL may include drain select lines, word lines, source select lines, and a common source line. In accordance with an embodiment of the present disclosure, the word lines may include normal word lines and dummy word lines. In accordance with an embodiment of the present disclosure, the row lines RL may further include a pipe select line.

The address decoder 121 may be operated under the control of the control logic 130. The address decoder 121 receives addresses ADDR from the control logic 130.

The address decoder 121 may decode a block address among the received addresses ADDR. The address decoder 121 selects at least one memory block from among the memory blocks BLK1 to BLKz in response to the decoded block address. The address decoder 121 is configured to decode a row address RADD among the received addresses ADDR. The address decoder 121 may select at least one word line of the selected memory block by applying voltages supplied from the voltage generator 122 to at least one word line WL in response to the decoded row address RADD.

During a program operation, the address decoder 121 may apply a program voltage to the selected word line and apply a pass voltage having a level lower than that of the program voltage to unselected word lines. During a program verify operation, the address decoder 121 may apply a verify voltage to a selected word line and apply a verify pass voltage having a level higher than that of the verify voltage to unselected word lines.

During a read operation, the address decoder 121 may apply a read voltage to a selected word line and apply a read pass voltage having a level higher than that of the read voltage to unselected word lines.

In accordance with an embodiment of the present disclosure, the erase operation of the memory device 100 may be performed on a memory block basis. During an erase operation, the addresses ADDR input to the memory device 100 include a block address. The address decoder 121 may decode the block address and select a single memory block in response to the decoded block address. During the erase operation, the address decoder 121 may apply a ground voltage to word lines coupled to the selected memory block.

In accordance with an embodiment of the present disclosure, the address decoder 121 may decode a column address among the received addresses ADDR. The decoded column address may be transferred to the read and write circuit 123. In an embodiment, the address decoder 121 may include components such as a row decoder, a column decoder, and an address buffer.

The voltage generator 122 may generate a plurality of operating voltages Vop using an external supply voltage that is supplied to the memory device 100. The voltage generator 122 may be operated under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate the plurality of operating voltages Vop using the external supply voltage or the internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage so as to generate a plurality of operating voltages Vop having various voltage levels, and may generate the plurality of operating voltages Vop by selectively enabling the plurality of pumping capacitors under the control of the control logic 130.

The generated operating voltages Vop may be supplied to the memory cell array 110 by the address decoder 121.

The read and write circuit 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm may be operated under the control of the control logic 130.

The first to m-th page buffers PB1 to PBm may transmit/receive data DATA to/from the data input/output circuit 124. During a program operation, the first to m-th page buffers PB1 to PBm receive data DATA to be stored through the data input/output circuit 124 and data lines DL.

During a program operation, the first to m-th page buffers PB1 to PBm may transfer the data DATA to be stored, received through the data input/output circuit 124, to selected memory cells through the bit lines BL1 to BLm when a program pulse is applied to a selected word line. The memory cells in the selected page are programmed based on the received data DATA. Memory cells coupled to a bit line to which a program permission voltage (e.g., a ground voltage) is applied may have increased threshold voltages. The threshold voltages of memory cells coupled to a bit line to which a program inhibit voltage (e.g., a supply voltage) is applied may be maintained. During a program verify operation, the first to m-th page buffers PB1 to PBm may read data stored in selected memory cells from the selected memory cells through the bit lines BL1 to BLm.

During a read operation, the read and write circuit 123 may read data DATA from the memory cells in the selected page through the bit lines BL, and may store the read data DATA in the first to m-th page buffers PB1 to PBm.

During an erase operation, the read and write circuit 123 may allow the bit lines BL to float. In an embodiment, the read and write circuit 123 may include a column select circuit.

The data input/output circuit 124 is coupled to the first to m-th page buffers PB1 to PBm through the data lines DL. The data input/output circuit 124 is operated in response to the control of the control logic 130.

The data input/output circuit 124 may include a plurality of input/output buffers (not illustrated) which receive input data DATA. During a program operation, the data input/output circuit 124 receives the data DATA to be stored from an external controller (not illustrated). During a read operation, the data input/output circuit 124 outputs the data DATA, received from the first to m-th page buffers PB1 to PBm included in the read and write circuit 123, to the external controller.

During a read operation or a verify operation, the sensing circuit 125 may generate a reference current in response to an enable bit VRYBIT signal generated by the control logic 130, and may output a pass signal or a fail signal to the control logic 130 by comparing a sensing voltage VPB received from the read and write circuit 123 with a reference voltage generated by the reference current.

The control logic 130 may be coupled to the address decoder 121, the voltage generator 122, the read and write circuit 123, the data input/output circuit 124, and the sensing circuit 125. The control logic 130 may control the overall operation of the memory device 100. The control logic 130 may be operated in response to a command CMD transmitted from an external device.

The control logic 130 may control the peripheral circuit 120 by generating various types of signals in response to the command CMD and the addresses ADDR. For example, the control logic 130 may generate an operation signal OPSIG, a row address RADD, read and write circuit control signals PBSIGNALS, and an enable bit VRYBIT in response to the command CMD and the addresses ADDR. The control logic 130 may output the operation signal OPSIG to the voltage generator 122, output the row address RADD to the address decoder 121, output the read and write circuit control signals PBSIGNALS to the read and write circuit 123, and output the enable bit VRYBIT to the sensing circuit 125. In addition, the control logic 130 may determine whether a verify operation has passed or failed in response to the pass or fail signal PASS or FAIL output from the sensing circuit 125.

In an embodiment, the control logic 130 may include the power application time storage 131.

The power application time storage 131 may be provided with information about power application times at set intervals or randomly from a memory controller 200. Each power application time may be a time elapsed after the storage device 50 is turned on. Information about power application time lastly provided from the memory controller 200 before the storage device 50 is turned off may be information about final power application time. The final power application time may be a period of time from when the storage device 50 is turned on to when the storage device 50 is turned off.

The power application time storage 131 may store information about a cumulative power application time obtained by accumulating the provided final power application times. The power application time storage 131 may store the information about the cumulative power application time in a memory block. The power application time storage 131 may provide the cumulative power application time information to the memory controller 200 in response to a request or command from the memory controller 200.

Figure 3:
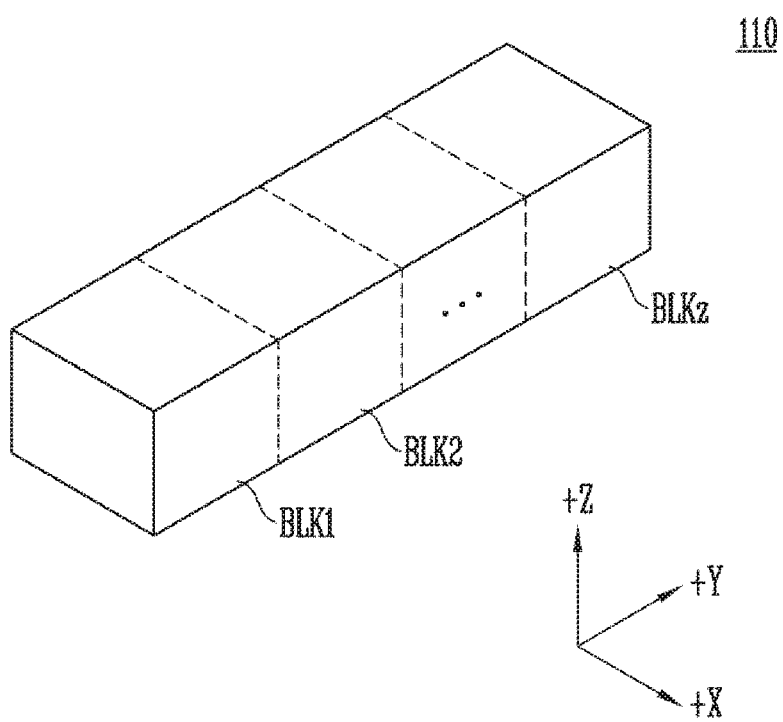
FIG. 3 is a diagram illustrating an embodiment of a memory cell array, such as that of FIG. 2.

FIG. 3 is a diagram illustrating an embodiment of the memory cell array of FIG. 2.

Referring to FIG. 3, the memory cell array 110 includes a plurality of memory blocks BLK1 to BLKz. Each memory block may have a three-dimensional (3D) structure. Each memory block includes a plurality of memory cells stacked on a substrate. Such memory cells are arranged in a positive X (+X) direction, a positive Y (+Y) direction, and a positive Z (+Z) direction. The structure of each memory block will be described in detail below with reference to FIGS. 4 and 5.

Figure 4:
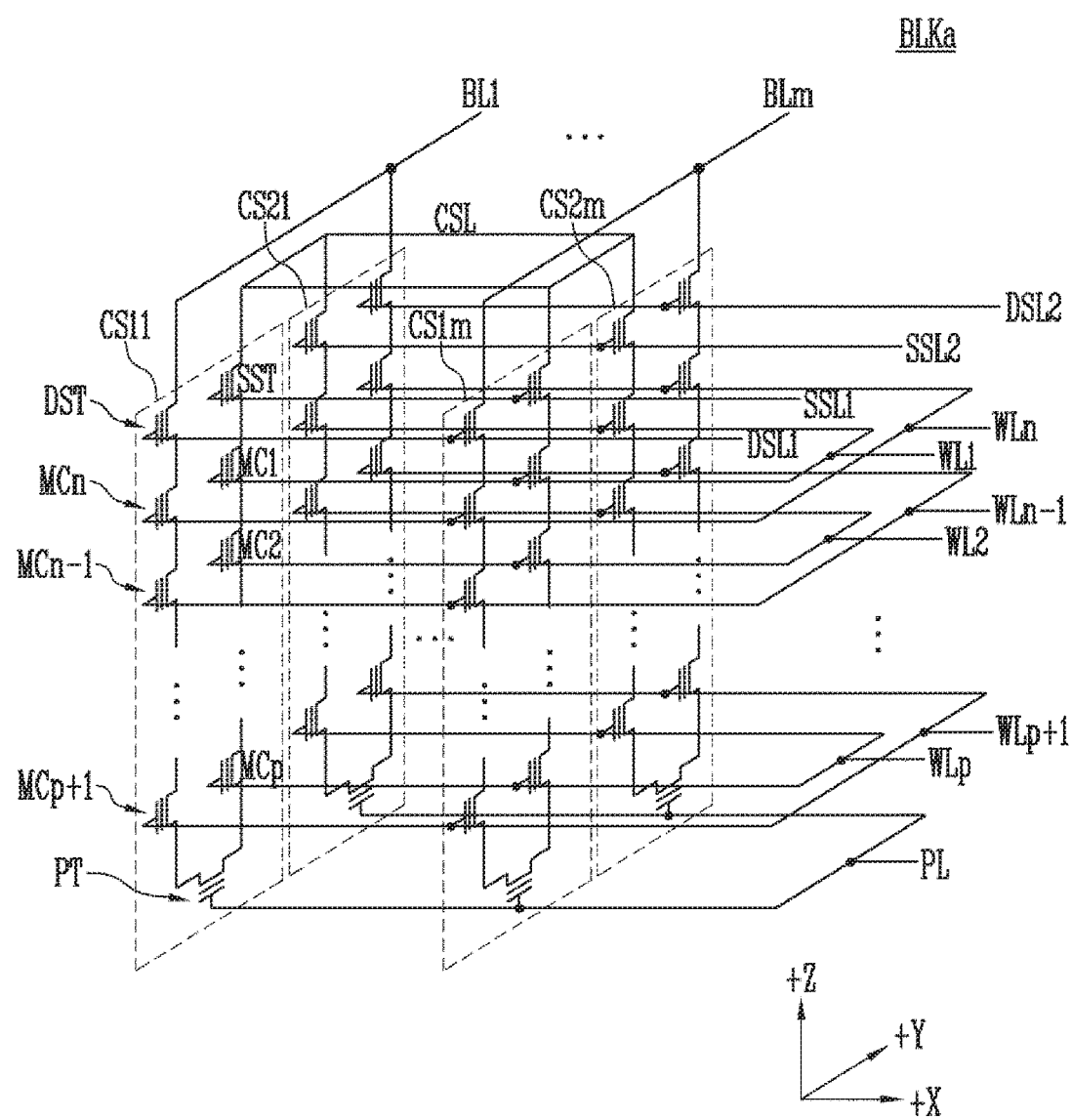
FIG. 4 is a circuit diagram illustrating an example of a memory block BLKa among memory blocks BLK1 to BLKz of FIG. 3.

FIG. 4 is a circuit diagram illustrating representative memory block BLKa of the memory blocks BLK1 to BLKz of FIG. 3.

Referring to FIG. 4, the memory block BLKa includes a plurality of cell strings CS11 to CS1m and CS21 to CS2m. In an embodiment, each of the cell strings CS11 to CS1m and CS21 to CS2m may be formed in a 'U' shape. In the memory block BLKa, m cell strings are arranged in a row direction (i.e. a positive (+) X direction). In FIG. 4, two cell strings are illustrated as being arranged in a column direction (i.e. a positive (+) Y direction). However, this illustration is made for clarity; it will be understood that three or more cell strings may be arranged in the column direction.

Each of the plurality of cell strings CS11 to CS1m and CS21 to CS2m includes at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided to each cell string. In an embodiment, a pillar for providing at least one of the channel layer, the tunneling insulating layer, the charge storage layer, and the blocking insulating layer may be provided to each cell string.

The source select transistor SST of each cell string is connected between the common source line CSL and memory cells MC1 to MCp.

In an embodiment, the source select transistors of cell strings arranged in the same row are coupled to a source select line extending in a row direction, and source select transistors of cell strings arranged in different rows are coupled to different source select lines. In FIG. 4, source select transistors of cell strings CS11 to CS1m in a first row are coupled to a first source select line SSL1. The source select transistors of cell strings CS21 to CS2m in a second row are coupled to a second source select line SSL2.

In an embodiment, source select transistors of the cell strings CS11 to CS1m and CS21 to CS2m may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are sequentially arranged in a direction opposite a positive (+) Z direction and are connected in series between the source select transistor SST and the pipe transistor PT. The p+1-th to n-th memory cells MCp+1 to MCn are sequentially arranged in the +Z direction and are connected in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

A gate of the pipe transistor PT of each cell string is coupled to a pipeline PL.

The drain select transistor DST of each cell string is coupled between the corresponding bit line and the memory cells MCp+1 to MCn. The cell strings in a row direction are coupled to drain select lines extending in a row direction.

Drain select transistors of cell strings CS11 to CS1m in the first row are coupled to a first drain select line DSL1. Drain select transistors of cell strings CS21 to CS2m in a second row are coupled to a second drain select line DSL2.

Cell strings arranged in a column direction are coupled to bit lines extending in a column direction. In FIG. 4, cell strings CS11 and CS21 in a first column are coupled to a first bit line BL1. Cell strings CS1m and CS2m in an m-th column are coupled to an m-th bit line BLm.

The memory cells coupled to the same word line in cell strings arranged in a row direction constitute a single page. For example, memory cells coupled to the first word line WL1, among the cell strings CS11 to CS1m in the first row, constitute a single page. Memory cells coupled to the first word line WL1, among the cell strings CS21 to CS2m in the second row, constitute a single additional page. Cell strings arranged in the direction of a single row may be selected by selecting any one of the drain select lines DSL1 and DSL2. A single page may be selected from the selected cell strings by selecting any one of the word lines WL1 to WLn.

In an embodiment, even bit lines and odd bit lines, instead of first to m-th bit lines BL1 to BLm, may be provided. Further, even-numbered cell strings, among the cell strings CS11 to CS1m or CS21 to CS2m arranged in a row direction, may be coupled to the even bit lines, respectively, and odd-numbered cell strings, among the cell strings CS11 to CS1m or CS21 to CS2m arranged in the row direction, may be coupled to the odd bit lines, respectively.

In an embodiment, one or more of the first to n-th memory cells MC1 to MCn may be used as dummy memory cells. For example, dummy memory cell(s) are provided to reduce an electric field between the source select transistor SST and the memory cells MC1 to MCp. Alternatively, the dummy memory cell(s) are provided to reduce an electric field between the drain select transistor DST and the memory cells MCp+1 to MCn. As more dummy memory cells are provided, the reliability of the operation of the memory block BLKa is improved, but the size of the memory block BLKa is increased. As fewer memory cells are provided, the size of the memory block BLKa is reduced, but the reliability of the operation of the memory block BLKa may be deteriorated.

In order to efficiently control the dummy memory cell(s), each of the dummy memory cells may have a required threshold voltage. Before or after the erase operation of the memory block BLKa is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 5:
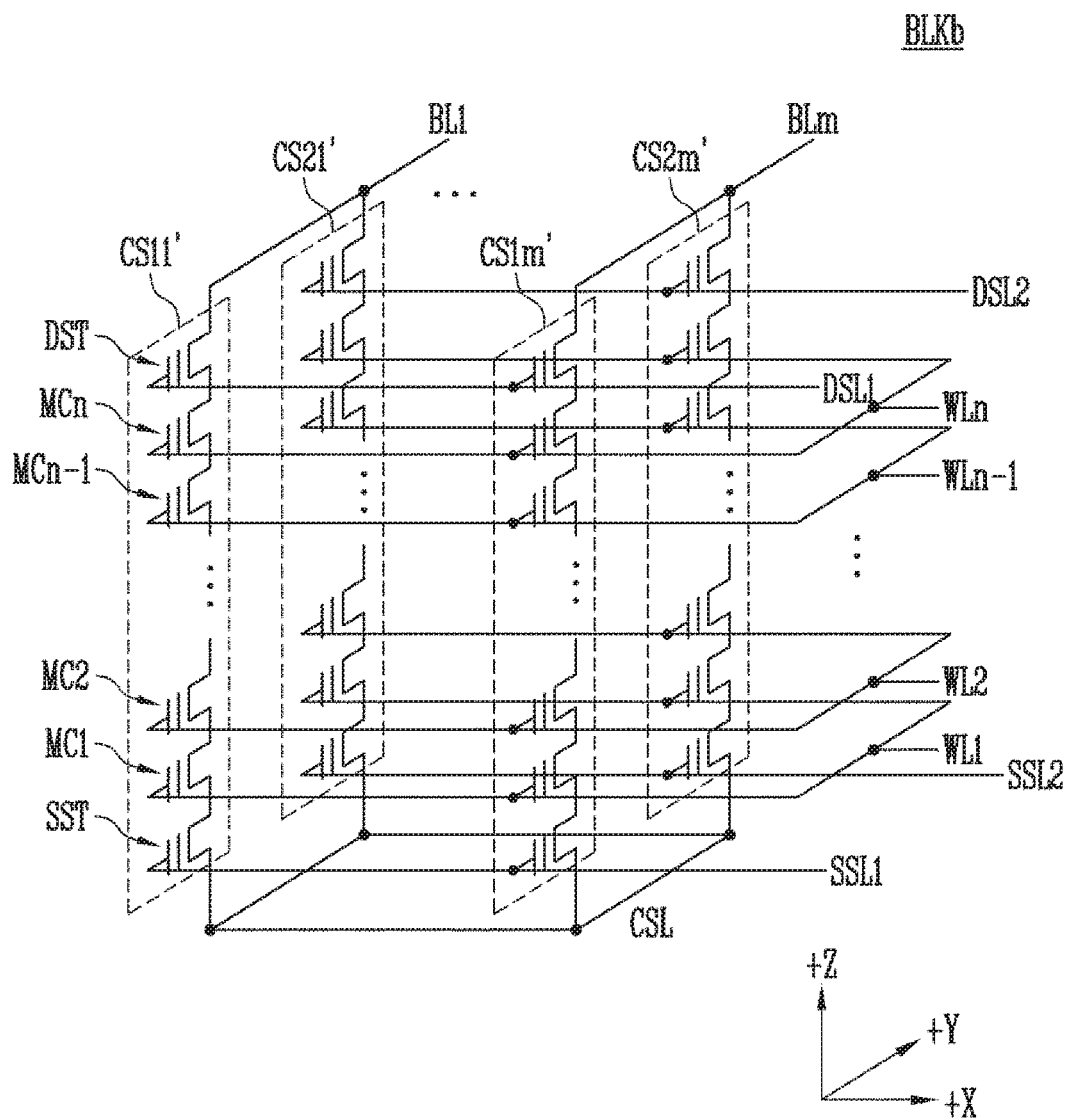
FIG. 5 is a circuit diagram illustrating an example of a memory block BLKb among the memory blocks BLK1 to BLKz of FIG. 3.

FIG. 5 is a circuit diagram illustrating a representative memory block BLKb of the memory blocks BLK1 to BLKz of FIG. 3.

Referring to FIG. 5, the memory block BLKb includes a plurality of cell strings CS11' to CS1m' and CS21' to CS2m'. Each of the plurality of cell strings CS11' to CS1m' and CS21' to CS2m' extends in a positive Z (+Z) direction. Each of the cell strings CS11' to CS1m' and CS21' to CS2m' includes at least one source select transistor SST, first to n-th memory cells MC1 to MCn, and at least one drain select transistor DST, which are stacked on a substrate (not illustrated) below the memory block BLKb.

The source select transistor SST of each cell string is connected between a common source line CSL and memory cells MC1 to MCn. The source select transistors of cell strings arranged in the same row are coupled to the same source select line. Source select transistors of cell strings CS11' to CS1m' arranged in a first row are coupled to a first source select line SSL1. Source select transistors of cell strings CS21' to CS2m' arranged in a second row are coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are connected in series between the source select transistor SST and the drain select transistor DST. The gates of the first to n-th memory cells MC1 to MCn are coupled to first to n-th word lines WL1 to WLn, respectively.

The drain select transistor DST of each cell string is connected between the corresponding bit line and the memory cells MC1 to MCn. Drain select transistors of cell strings arranged in a row direction are coupled to drain select lines extending in a row direction. The drain select transistors of the cell strings CS11' to CS1m' in the first row are coupled to a first drain select line DSL1. The drain select transistors of the cell strings CS21' to CS2m' in the second row are coupled to a second drain select line DSL2.

As a result, the memory block BLKb of FIG. 5 has an equivalent circuit similar to that of the memory block BLKa of FIG. 4 except that a pipe transistor PT is excluded from each cell string.

In an embodiment, even bit lines and odd bit lines, instead of first to m-th bit lines BL1 to BLm, may be provided. Further, even-numbered cell strings, among the cell strings CS11' to CS1m' or CS21' to CS2m' arranged in a row direction, may be coupled to the even bit lines, respectively, and odd-numbered cell strings, among the cell strings CS11' to CS1m' or CS21' to CS2m' arranged in the row direction, may be coupled to the odd bit lines, respectively.

In an embodiment, one or more of the first to n-th memory cells MC1 to MCn may be used as dummy memory cells. For example, the dummy memory cell(s) are provided to reduce an electric field between the source select transistor SST and the memory cells MC1 to MCn. Alternatively, the dummy memory cells) are provided to reduce an electric field between the drain select transistor DST and the memory cells MC1 to MCn. As more dummy memory cells are provided, the reliability of the operation of the memory block BLKb is improved, but the size of the memory block BLKb is increased. As fewer memory cells are provided, the size of the memory block BLKb is reduced, but the reliability of the operation of the memory block BLKb may be deteriorated.

In order to efficiently control the dummy memory cell(s), each of the dummy memory cells may have a required threshold voltage. Before or after the erase operation of the memory block BLKb is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 6:
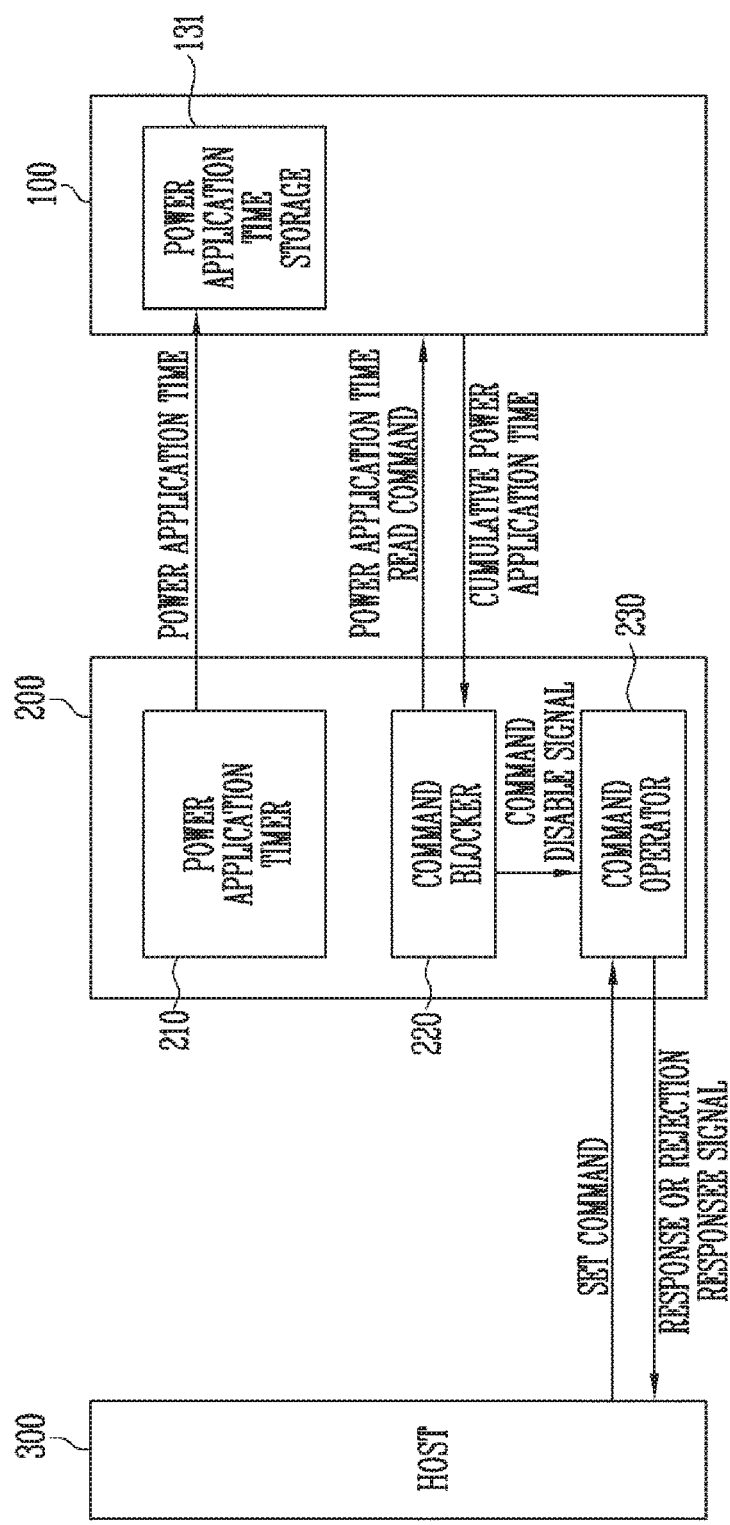
FIG. 6 is a diagram illustrating the structure and operation of a memory controller according to an embodiment of the present disclosure.

FIG. 6 is a diagram illustrating the structure and operation of a memory controller, e.g., memory controller 200, according to an embodiment of the present disclosure.

Referring to FIG. 6, the memory device 100 may include the power application time storage 131.

The power application time storage 131 may be provided with information about power application times at set intervals or randomly from a power application timer 210. Each power application time may be a period of time during which power is applied to the storage device 50, after being turned on. Final power application time may be a period of time from when the storage device 50 is turned on to when the storage device 50 is turned off, described above with reference to FIG. 1.

The power application time storage 131 may store information about a cumulative power application time obtained by accumulating the provided final power application times. The power application time storage 131 may provide the cumulative power application time information to a command blocker 220 in response to a power application time read command provided by the command blacker 220.

In an embodiment, the memory controller 200 may include the power application timer 210, the command blocker 220, and a command operator 230.

The power application timer 210 may measure power application times. The power application timer 210 may provide information about the measured power application times to the power application time storage 131 at set intervals or randomly.

The command blocker 220 may periodically provide the power application time read command to the power application time storage 131. Alternatively, the command blocker 220 may provide the power application time read command to the power application time storage 131 in response to a request from the host 300. The command blocker 220 may acquire the information about the cumulative power application time provided by the power application time storage 131 in response to the power application time read command. The cumulative power application time may be obtained by accumulating the measured power application times. The command blocker 220 may disable a set command that is input to the storage device depending on the cumulative power application time.

For example, the command blocker 220 may disable the set command based on the result of a comparison between the cumulative power application time and a threshold time. For example, when the cumulative power application time exceeds the threshold time, the command blocker 220 may disable the set command. The command blocker 220 may generate a command disable signal for disabling the set command, and may provide the command disable signal to the command operator 230.

The command operator 230 may receive the set command from the host 300.

In an embodiment, the set command may include a command for requesting data required in order to analyze the storage device 50, described above with reference to FIG. 1. The set command may include a command used to test the storage device 50. The set command may include a command for requesting to change information about the operation of the memory controller 200. The information about the operation of the memory controller 200 may include information related to firmware such as a Flash Translation Layer (FTL). The set command may include a command for requesting to change setting information of the memory device 100. The setting information of the memory device 100 may be information including parameter values for the internal operation of the memory device 100, such as a read operation, a program operation, and an erase operation.

The host 300 may access the internal operation information of the storage device 50, firmware-related information of the memory controller 200, or the setting information of the memory device 100 using the set command. The host 300 may read, modify or delete the accessed information using the set command.

The command operator 230 may provide a response to the set command to the host 300. When the set command is disabled, the command operator 230 may provide a rejection response signal for the set command to the host 300. In detail, the command operator 230 may provide the rejection response signal for the set command to the host 300 in response to the command disable signal.

Figure 7:
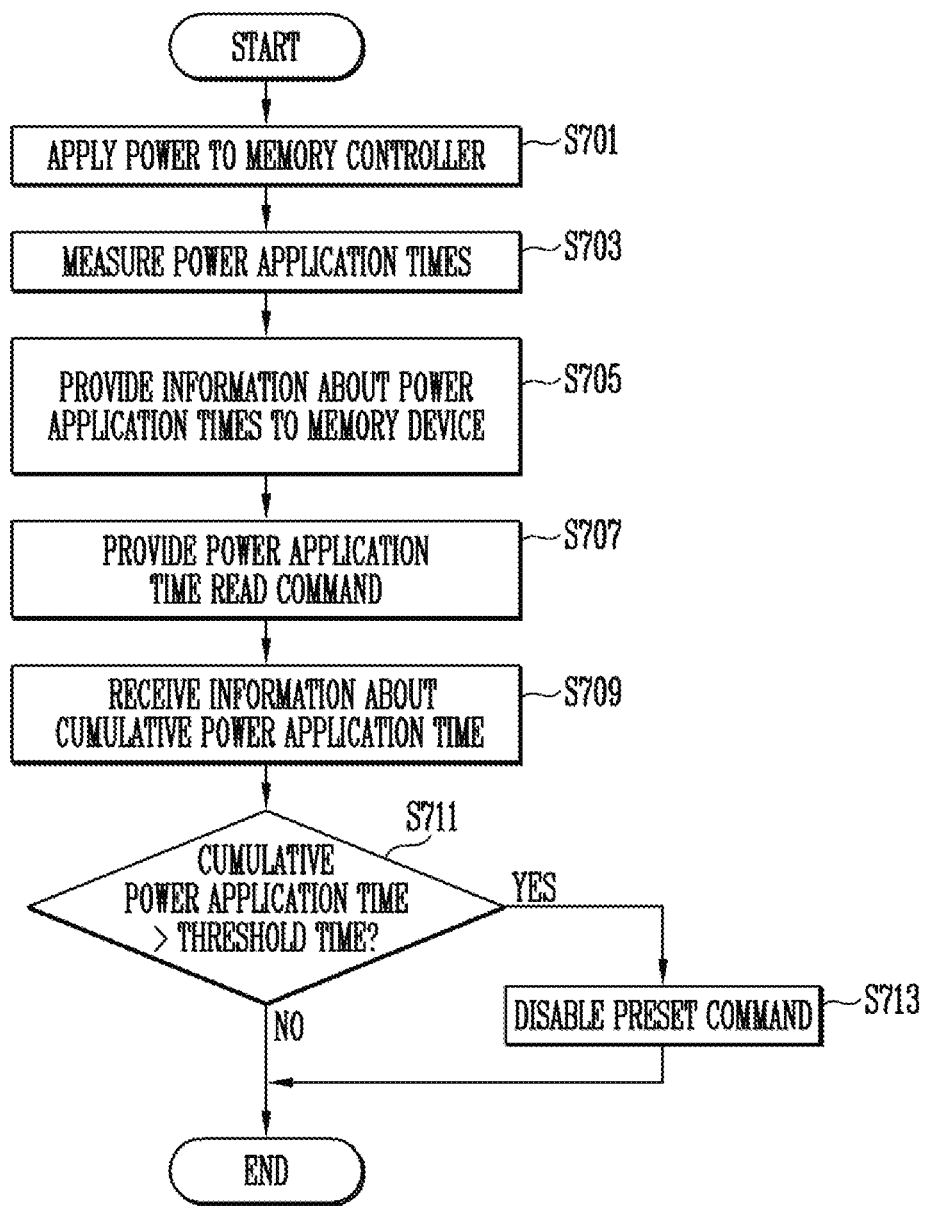
FIG. 7 is a flowchart illustrating the operation of a memory controller according to an embodiment of the present disclosure.

FIG. 7 is a flowchart illustrating the operation of a memory controller, e.g., memory controller 200, according to an embodiment of the present disclosure.

Referring to FIG. 7, at step S701, power may be applied to the memory controller.

At step S703, the memory controller may measure power application times. Each power application time may be a time elapsed after the storage device is turned on.

At step S705, the memory controller 200 may provide information about the measured power application times to the memory device at set intervals, e.g., periodically, or randomly.

At step S707, the memory controller may provide a power application time read command to the memory device. The power application time read command may be for requesting the cumulative power application time information stored in the memory device. The cumulative power application time may be time obtained by accumulating the measured power application times provided by the memory controller.

At step S709, the memory controller may receive the cumulative power application time information provided from the memory device in response to the power application time read command.

At step S711, the memory controller may determine whether the cumulative power application time exceeds a threshold time. When the cumulative power application time exceeds the threshold time (that is, "YES" at step S711), the process proceeds to step S713. Otherwise (that is, "NO" at step S711), the process is terminated.

At step S713, the memory controller may disable a set command. When the set command is disabled, the memory controller may output a rejection response signal for the set command to an external system.

Figure 8:
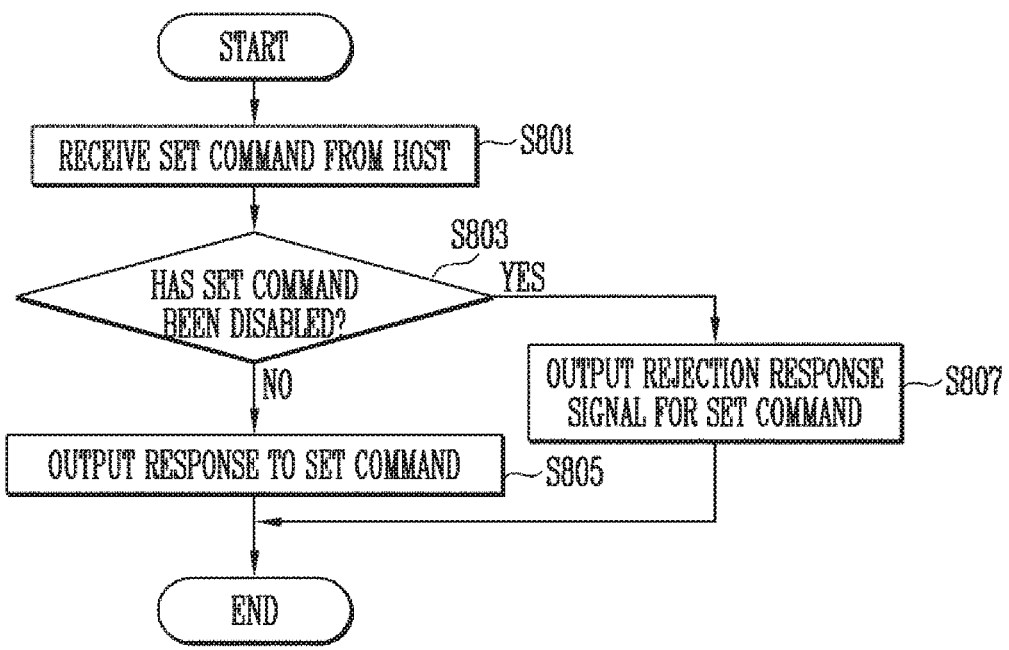
FIG. 8 is a flowchart illustrating the operation of a memory controller according to an embodiment of the present disclosure.

FIG. 8 is a flowchart illustrating the operation of a memory controller, e.g., memory controller 200, according to an embodiment of the present disclosure.

Referring to FIG. 8, at step S801, the memory controller 200 may receive a set command from a host.

At step S803, the memory controller may determine whether the set command has been disabled. When it is determined that the set command has been disabled (that is, "YES" at step S803), the process proceeds to step S807; otherwise (that is, "NO" at step S803), the process proceeds to step S805.

At step S805, the memory controller may output a response to the set command to the host.

At step S807, the memory controller may output a rejection response signal for the set command to the host.

Figure 9:
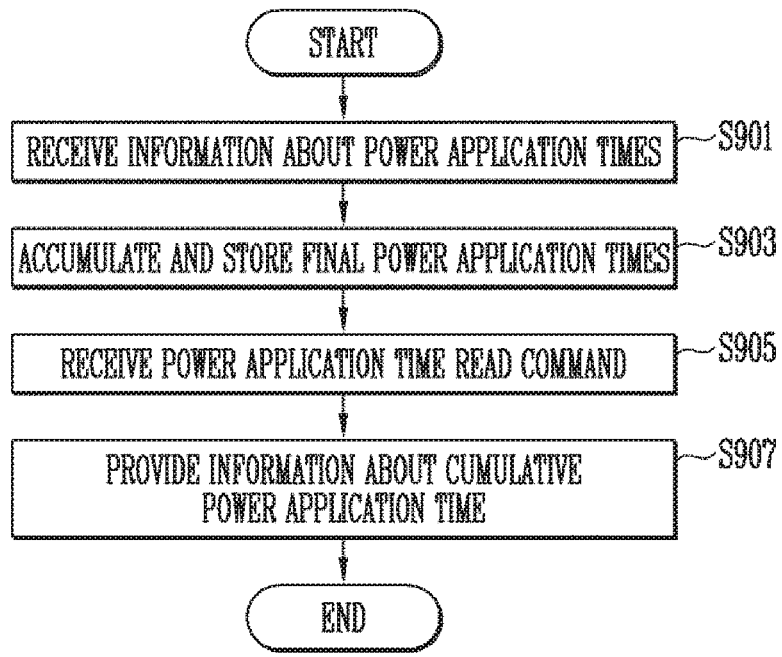
FIG. 9 is a flowchart illustrating the operation of a memory device according to an embodiment of the present disclosure.

FIG. 9 is a flowchart illustrating the operation of a memory device, e.g., memory device 100, according to an embodiment of the present disclosure.

Referring to FIG. 9, at step S901, the memory device may receive information about power application times measured by a memory controller. Each power application time may be a time elapsed until power is interrupted from the start of application of power to the memory controller.

At step S903, the memory device may store information about a cumulative power application time obtained by accumulating the measured individual power application times. The cumulative power application time information may be stored in a memory block of the memory device.

At step S905, the memory device may receive the power application time read command from the memory controller. The power application time read command may be for allowing the memory controller to request the cumulative power application time information stored in the memory device.

At step S909, the memory device may provide the cumulative power application time information to the memory controller.

Figure 10:
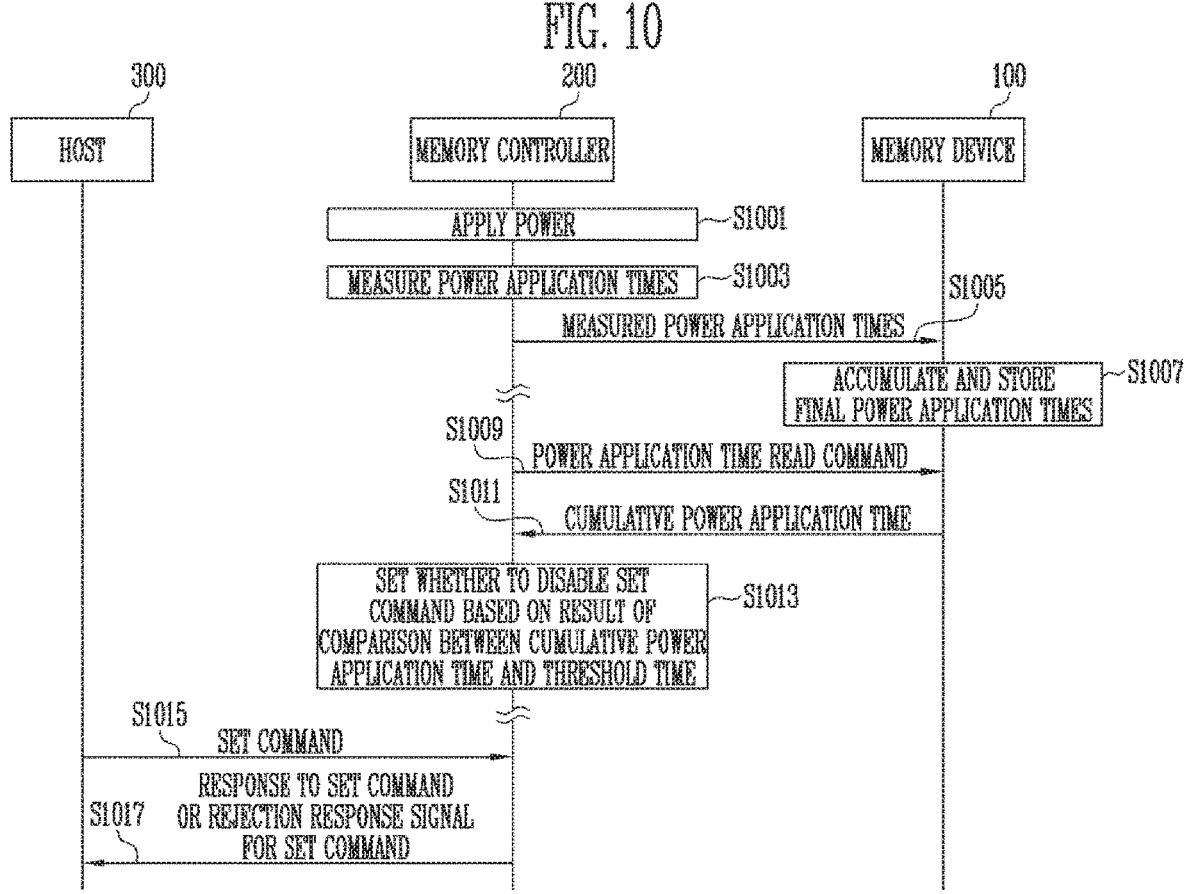
FIG. 10 is a flowchart illustrating operations performed between a host, a memory controller, and a memory device.

FIG. 10 is a flowchart illustrating operations performed between a host, e.g., host 300, a memory controller, e.g., memory controller 200, and a memory device, e.g., memory device 100.

Referring to FIG. 10, at step S1001, power may be applied to the memory controller.

At step S1003, the memory controller may measure each of the power application times. Each power application time may be a time elapsed until power is interrupted from the start of application of power to the memory controller.

At step S1005, the memory controller may provide information about the measured power application times to the memory device at intervals of a set period or randomly.

At step S1007, the memory device may accumulate and store the received individual power application times. In detail, the memory device may store information about a cumulative power application time obtained by accumulating the measured individual power application times.

At step S1009, the memory controller may provide the power application time read command to the memory device.

At step S1011, the memory device may provide the information about the cumulative power application time to the memory controller in response to the power application time read command.

At step S1013, the memory controller may compare the cumulative power application time with a threshold time. The memory controller may set, based on the result of the comparison, whether to disable a set command. For example, the memory controller may disable the set command when the cumulative power application time exceeds the threshold time.

At step S1015, the memory controller may receive the set command from the host.

At step S1017, the memory controller may provide a response to the set command to the host. When the set command is disabled, the memory controller may provide a rejection response signal for the set command to the host.

Figure 11:
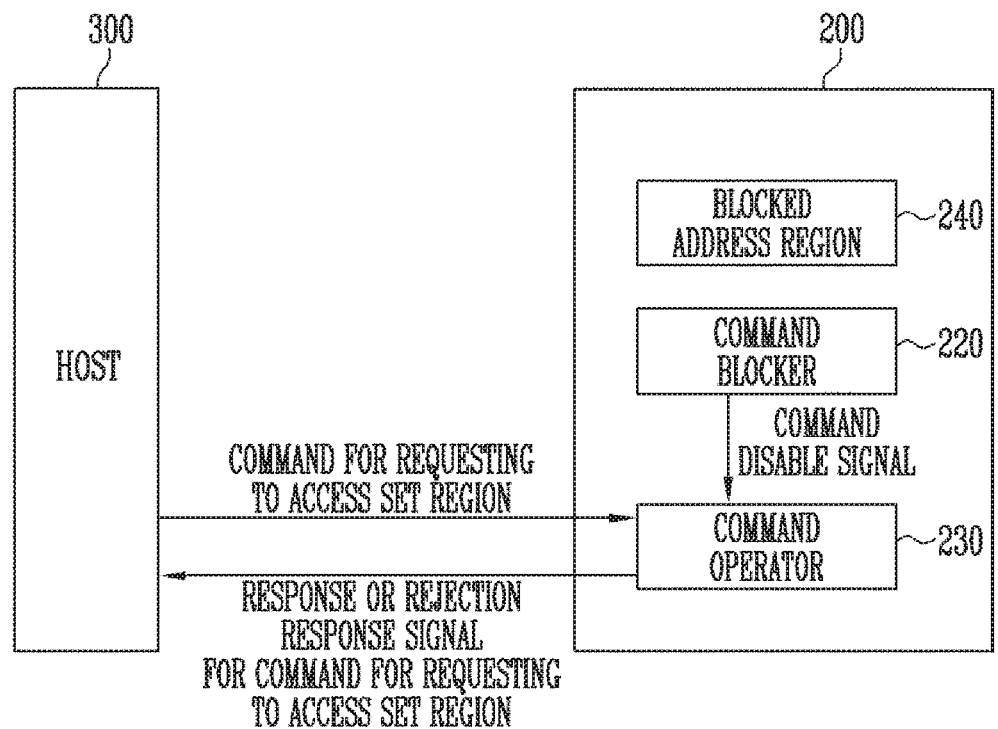
FIG. 11 is a diagram illustrating the structure and operation of the memory controller of FIG. 6 according to an embodiment of the present disclosure.

FIG. 11 is a diagram illustrating the structure and operation of the memory controller 200 according to an embodiment of the present disclosure.

Referring to FIG. 11, the memory controller 200 may additionally include a blocked address region 240.

The command blocker 220 may disable a command for requesting access to a set region, the command which is input from the host 300 to the command operator 230, depending on a cumulative power application time. The cumulative power application time may be obtained by accumulating individual times during which power is applied to the memory controller 200. The command for requesting access to the set region may be a command for requesting to read, modify or delete information stored in the set region.

The command blocker 220 may disable the command for requesting access to the set region based on the result of a comparison between the cumulative power application time and a threshold time. When the cumulative power application time exceeds the threshold time, the command blocker 220 may disable the command for requesting access to the set region. The command blacker 220 may generate a command disable signal for disabling such attempted access command, and may provide the command disable signal to the command operator 230.

The command operator 230 may receive the command for requesting access to the set region from the host 300. The command operator 230 may provide a response to such received command to the host 300. When the command for requesting access to the set region is disabled, the command operator 230 may provide a rejection response signal for such command. In detail, the command operator 230 may provide the rejection response signal for the command for requesting access to the set region to the host 300 in response to the command disable signal.

The blocked address region 240 may be a region in which information, to which external access is restricted, is stored. In detail, the blocked address region 240 may be a region in which information related to the operation of the memory controller 200, such as firmware-related information, is stored. The blocked address region 240 may be a region in which the setting information of the memory device, described above with reference to FIG. 1, is stored. The setting information of the memory device may be information including parameter values for the internal operation of the memory device, such as a read operation, a program operation, and an erase operation. The blocked address region 240 may be a region in which system information for the internal operation of the storage device, described above with reference to FIG. 1, is stored.

In an embodiment, the blocked address region 240 may be the set region.

Figure 12:
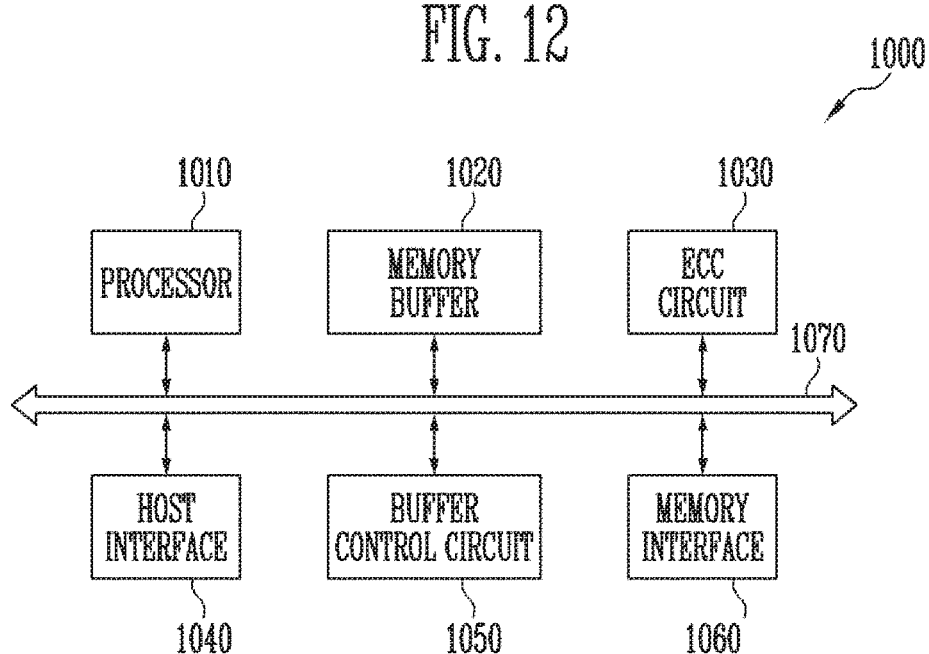
FIG. 12 is a diagram illustrating an embodiment of a memory controller, such as that of FIG. 1.

FIG. 12 is a diagram illustrating an embodiment of the memory controller of FIG. 1.

Referring to FIG. 12, a memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

The memory controller 1000 may include a processor 1010, a memory buffer 1020, an error checking and correction (ECC) circuit 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may derandomize data received from the memory device during a read operation. For example, the processor 1010 may derandomize the data received from the memory device using a derandomizing seed. The derandomized data may be output to the host.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC circuit 1030 may perform error correction. The Ecc circuit 1030 may perform error correction code (ECC) encoding based on data to be written to the memory device through the memory interface 1060. The ECC-encoded data may be transferred to the memory device through the memory interface 1060. The ECC circuit 1030 may perform ECC decoding based on data received from the memory device through the memory interface 1060. In an example, the ECC circuit 1030 may be included as the component of the memory interface 1060 in the memory interface 1060.

The host interface 1040 may communicate with the external host under the control of the processor 1010. The host interface 1040 may perform communication using at least one of various communication methods, such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, so as not to interfere or influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 13:
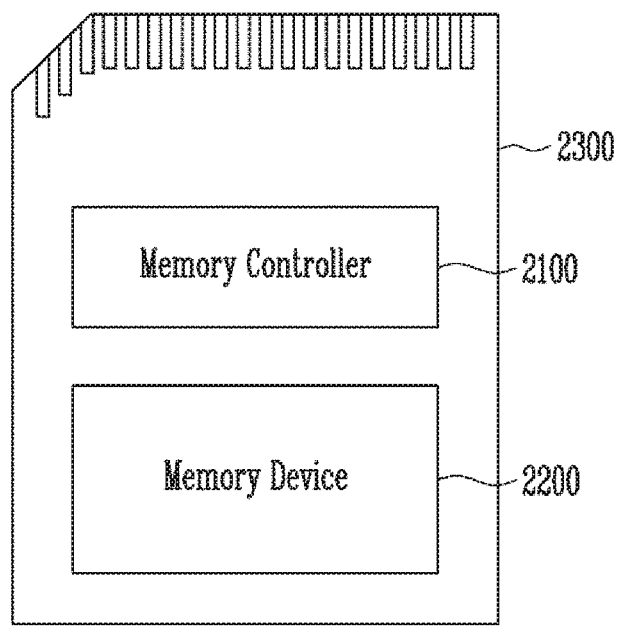
FIG. 13 is a block diagram illustrating a memory card system to which a storage device according to an embodiment of the present disclosure is applied.

FIG. 13 is a block diagram illustrating a memory card system to which a storage device according to an embodiment of the present disclosure is applied.

Referring to FIG. 13, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may be control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same way as the memory controller 200 described above with reference to FIG. 1.

In an embodiment, the memory controller 2100 may include components, such as a RAM, a processor, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols, such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (DATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin-Torque Magnetic RAM (STT-MRAM).

The memory controller 2100 and the memory device 2200 may be integrated into a single semiconductor device to configure a memory card, such as a PC card (personal computer memory card international association: PCMCIA), a compact flash card (CF), a smart media card (SM or SMC), a memory stick, a multimedia card (MMC, RS- MMC, MMCmicro or eMMC), a SD card (SD, miniSD, microSD, or SDHC), or a universal flash storage (UFS), FIG. 14 is a block diagram illustrating a solid state drive (SSD) system to which a storage device according to an embodiment of the present disclosure is applied.

Figure 14:
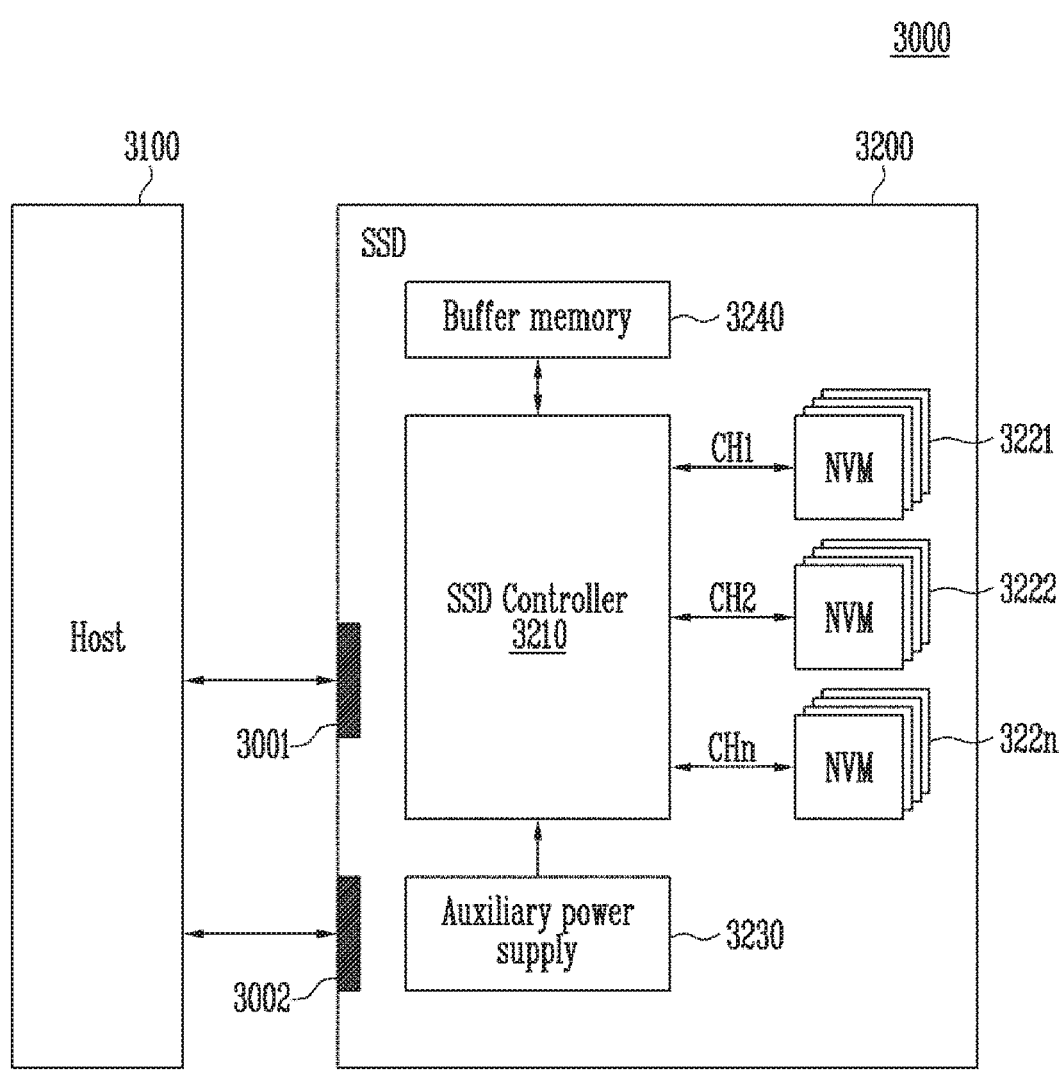
FIG. 14 is a block diagram illustrating an example of a solid state drive (SSD) system to which a storage device according to an embodiment of the present disclosure is applied.

Referring to FIG. 14, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In accordance with an embodiment of the present disclosure, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces, such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when power from the host 3100 is not smoothly supplied. In an embodiment, the auxiliary power supply 3230 may be positioned within or externally to the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include any of various volatile memories, such as DRAM, SDRAM, DDR SDRAM, LPDDR SDRAM, and GRAM or nonvolatile memories such as FRAM, ReRAM, STT-MRAM, and PRAM.

Figure 15:
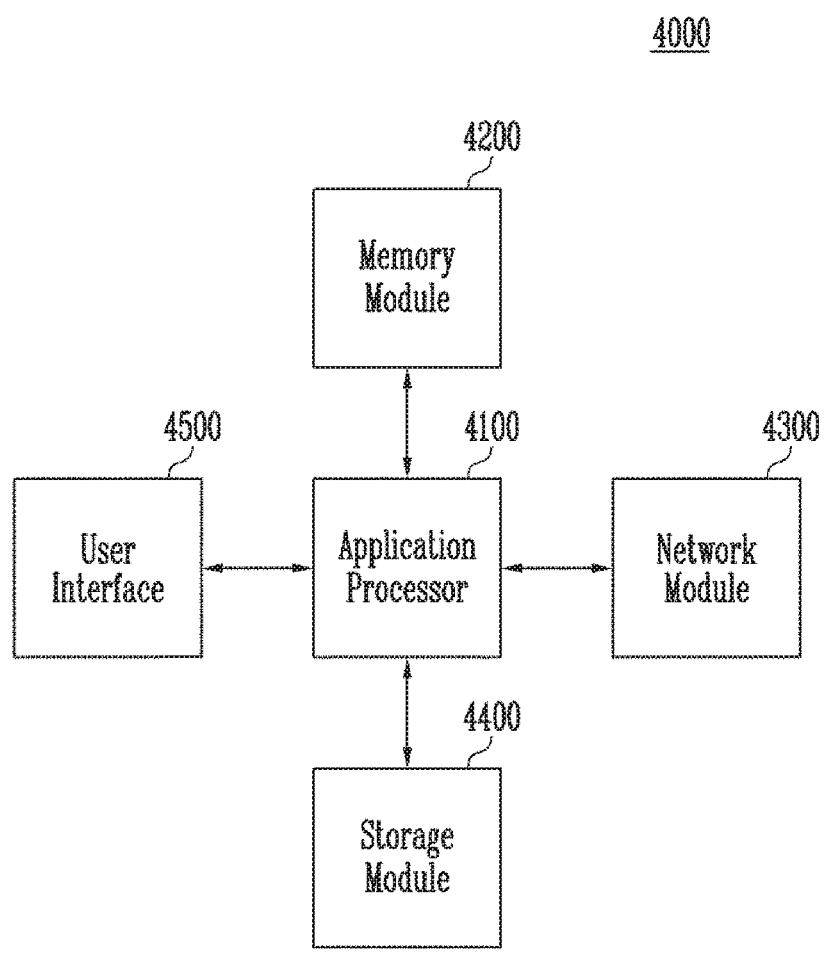
FIG. 15 is a block diagram illustrating a user system to which a storage device according to an embodiment of the present disclosure is applied.

FIG. 15 is a block diagram illustrating a user system to which a storage device according to an embodiment of the present disclosure is applied.

Referring to FIG. 15, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device 100 described above with reference to FIG. 1. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a motor.

In accordance with embodiments of the present disclosure, a storage device having improved security and a method of operating the storage device are provided.

While various embodiments of the present disclosure have been disclosed, those skilled in the art will appreciate in light of the present disclosure that various modifications, additions and substitutions are possible, without departing from the scope and spirit of the present disclosure. Therefore, the scope of the present disclosure is defined by the appended claims and equivalents of the claims rather than by the description preceding them.

In the above-discussed embodiments, any of the steps may be selectively performed or skipped. In addition, the steps in each embodiment may not always be sequentially performed in given order, but may be performed in other suitable orders. Furthermore, the embodiments disclosed in the present specification and the drawings aim to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A memory controller, comprising:
   a power application timer configured to measure each of plural final power application times, each final power application time being a period of time during which power is applied to the memory controller until the memory controller is turned off after being turned on; and
   a command blocker configured to disable a set command, among commands that are input from a host to the memory controller based on a comparison between a threshold time and a cumulative power application time obtained by accumulating the plural final power application times.

2. The memory controller according to claim 1, further comprising a command operator configured to output a response to the set command to the host.

3. The memory controller according to claim 1, wherein the command blocker is configured to, when the cumulative power application time exceeds the threshold time, generate a command disable signal for disabling the set command and provide the command disable signal to the command operator.

4. The memory controller according to claim 3, wherein the command operator outputs a rejection response signal for the set command to the host in response to the command disable signal.

5. The memory controller according to claim 1, wherein the set command comprises at least one of a command used to test the memory controller, a command for requesting data to analyze the memory controller, a command for requesting change to firmware-related information of the memory controller, a command for requesting change to setting information of a memory device controlled by the memory controller, a command for requesting access to a region in which the firmware-related information is stored, and a command for requesting access to a region in which the setting information is stored.

6. A storage device, comprising:
   a memory device configured to store information about a cumulative power application time that is obtained by accumulating individual time periods during which power is applied to a storage device until the storage device is turned off after being turned on; and
   a memory controller configured to disable a set command, among commands that are input from a host to the storage device, based on a comparison between a threshold time and the cumulative power application time.

7. The storage device according to claim 6, wherein the memory controller is configured to output a rejection response signal for the set command to the host when the cumulative power application time exceeds the threshold time.

8. The storage device according to claim 6, wherein the memory controller comprises:
   a power application timer configured to measure power application times, each being a period of time during which power is applied to the storage device after the storage device is turned on; and
   a command blocker configured to disable the set command depending on the cumulative power application time; and
   a command operator configured to output a response to the set command to the host.

9. The storage device according to claim 8, wherein the memory device comprises a power application time storage configured to store the information about the cumulative power application time.

10. The storage device according to claim 9, wherein:
    the power application timer provides information about the power application times to the power application time storage at set intervals or randomly,
    information about power application time lastly provided to the power application time storage before the storage device is turned off is information about final power application time, and
    the cumulative power application time is a time obtained by accumulating final power application times.

11. The storage device according to claim 8, wherein the command blocker is configured to, when the cumulative power application time exceeds a threshold time, generate a command disable signal for disabling the set command and provide the command disable signal to the command operator.

12. The storage device according to claim 11, wherein the command operator outputs a rejection response signal for the set command to the host in response to the command disable signal.

13. The storage device according to claim 6, wherein:
    the set command comprises a command for requesting access to a set region, and
    the set region comprises at least one of a region in which system information for an internal operation of the storage device is stored, a region in which firmware-related information of the storage device is stored, and a region in which setting information of the memory device is stored.

14. The storage device according to claim 6, wherein the set command comprises at least one of a command used to test the storage device, a command for requesting data to analyze the storage device, a command for requesting change to firmware-related information of the storage device, and a command for requesting change to setting information of the memory device.

15. A method of operating a storage device, comprising:
    measuring final power application times, each being a period of time during which power is applied to the storage device until the storage device is turned off after being turned on;
    storing information about a cumulative power application time obtained by accumulating the measured final power application times; and
    disabling a set command, among commands that are input from a host to the storage device based on a comparison between a threshold time and the cumulative power application time.

16. The method according to claim 15, wherein the cumulative power application time is obtained by accumulating the final power application times.

17. The method according to claim 15, further comprising outputting, when the cumulative power application time exceeds the threshold time, a rejection response signal for the set command to the host.

* * * * *